(12) United States Patent
Andrews

(10) Patent No.: US 6,991,236 B1
(45) Date of Patent: Jan. 31, 2006

(54) DEVICE FOR SECURING A SEALING MEMBER IN A PREDETERMINED POSITION

(75) Inventor: Lawrence J. Andrews, Cheswick, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 238 days.

(21) Appl. No.: 09/687,172

(22) Filed: Oct. 16, 2000

(51) Int. Cl.
*F16J 15/56* (2006.01)

(52) U.S. Cl. .................. 277/587; 251/363; 251/900
(58) Field of Classification Search ............. 277/435, 277/437, 452, 453, 502, 584, 585, 587; 251/900, 251/361, 363, 367; 137/625.69
See application file for complete search history.

(56) References Cited

U.S. PATENT DOCUMENTS

| | | | |
|---|---|---|---|
| 3,000,610 A | * | 9/1961 | Bryant |
| 3,126,915 A | * | 3/1964 | Hunt |
| 3,199,540 A | * | 8/1965 | Forster |
| 3,819,152 A | * | 6/1974 | Clippard, III |
| 3,968,971 A | * | 7/1976 | Mariaulle |
| 4,491,155 A | * | 1/1985 | Meyer et al. |
| 4,630,800 A | * | 12/1986 | Brausfeld et al. |
| 5,172,727 A | * | 12/1992 | Stoll et al. |
| 5,190,078 A | * | 3/1993 | Stoll et al. |
| 5,337,787 A | * | 8/1994 | Fiondella |

* cited by examiner

*Primary Examiner*—Alison K. Pickard
(74) *Attorney, Agent, or Firm*—The Webb Law Firm

(57) ABSTRACT

A device for securing a sealing member in a predetermined position. The device comprises a positioning element of a predetermined size and shape having a first surface and a second surface, and a retaining element of a predetermined size and shape disposed on at least one of the first surface and second surface of the positioning element.

15 Claims, 3 Drawing Sheets

DEVICE FOR SECURING A SEALING MEMBER IN A PREDETERMINED POSITION

FIELD OF INVENTION

The present invention relates, in general, to a pressure release valve, and more particularly, to a device for securing a sealing member in a pressure release valve.

BACKGROUND OF THE INVENTION

Prior to the present invention, o-rings in a standard packed-bore type pressure release valve with a high pressure port and a low pressure port are disposed about a recess created between the flanges of two adjacent spool valve shells. During slow cycling of the valve while under high pressure, o-rings can become dislodged from the recess, causing operational problems. Viton™ material is typically used because it has a greater stiffness in order to prevent the o-rings from dislodging from the high pressure during valve actuation. However, at −40° F., functional testing has revealed that a Viton™ o-ring does not provide a leak-proof seal. To correct the problem, the Viton™ o-ring was replaced with a nitrile o-ring of the same size. Because it is softer than Viton™, the nitrile material provides a leak-proof seal. However, functional testing of the valve with the nitrile o-rings revealed that when the valve is actuated, the resultant high pressure might dislodge the nitrile o-ring, causing interference with the normal operation of the valve.

When the rate of actuation of the valve increases, o-ring dislodgement is minimized. However, depending on the particular application, a high rate of actuation may not always be possible with a valve that relies on a pressure differential method of operation. While the greater stiffness of the Viton™ o-rings eliminates the dislodgement problem, the operational range and performance of the valve is adversely affected as a result.

SUMMARY OF THE INVENTION

In a first aspect, the present invention provides a device for securing an o-ring in a predetermined position. The device comprises a positioning element of a predetermined size and shape having a first surface and a second surface. A retaining element of a predetermined size and shape is disposed on at least one of the first surface and the second surface of the positioning element.

In a further aspect, the present invention provides for a device for securing a plurality of sealing members in a predetermined position. The device comprises two positioning elements of a predetermined size and shape having a first surface and a second surface. Two retaining elements of a predetermined size and shape are disposed on the first surface of the positioning elements. A spacer means of a predetermined size and shape locates the positioning elements a predetermined position from each other.

In still a further aspect, the present invention provides a device in combination with a pressure release valve having a high pressure port, a low pressure port, a spool valve, check valve, and a reset spool. The spool valve, check valve, and reset spool further have a plurality of spool valve shells. The improvement comprises the spool valve shell having two positioning elements of a predetermined size and shape. Two retaining elements of a predetermined size and shape are disposed on the positioning elements. A spacer means of a predetermined size and shape locate the positioning elements a predetermined distance from each other. A sealing member of a predetermined size and shape is disposed intermediate two opposing positioning elements of two adjacent spool valve shells. The retaining elements on the opposing positioning elements secure the sealing member in position when the pressure release valve is actuated.

OBJECTS OF THE INVENTION

It is therefore the primary object of the present invention to provide a device for restricting the dislodgement of the o-ring in a pressure release valve.

Another object of the present invention is to provide the potential for utilizing various o-ring materials than can ultimately provide improved sealing characteristics and superior valve performance.

Another object of the present invention is to provide a spool valve shell configuration that is interchangeable with the standard design with minimal or no modifications to the valve.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

Figure 1:
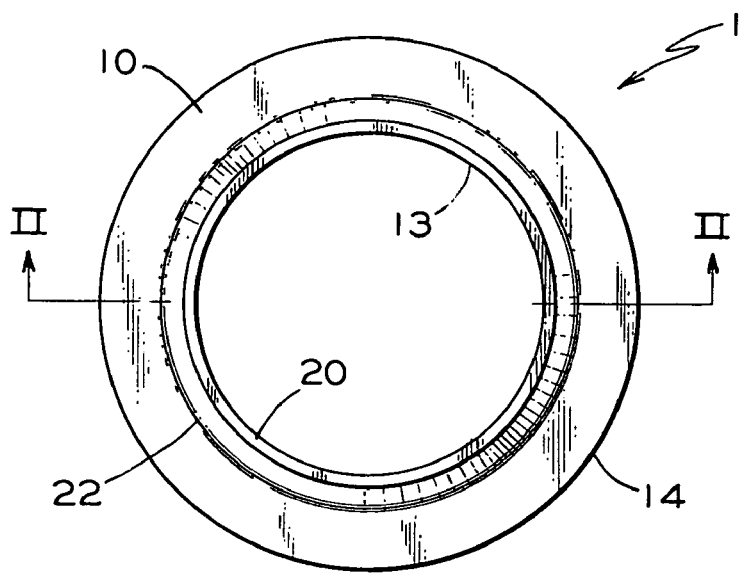
FIG. 1 is a front view of the device for securing a sealing member in a predetermined position.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been designated with identical reference numerals for the sake of clarity.

Figure 2:
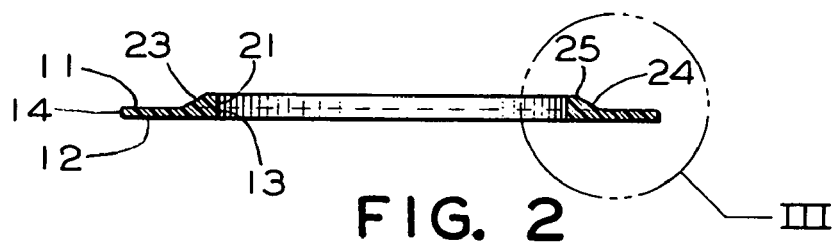
FIG. 2 is a vertical section view taken along the lines II—II of FIG. 1.
Figure 3:
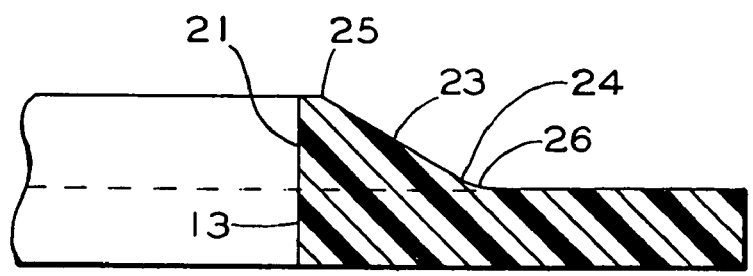
FIG. 3 is a detailed view taken from the encircled area III of FIG. 2.
Figure 6:
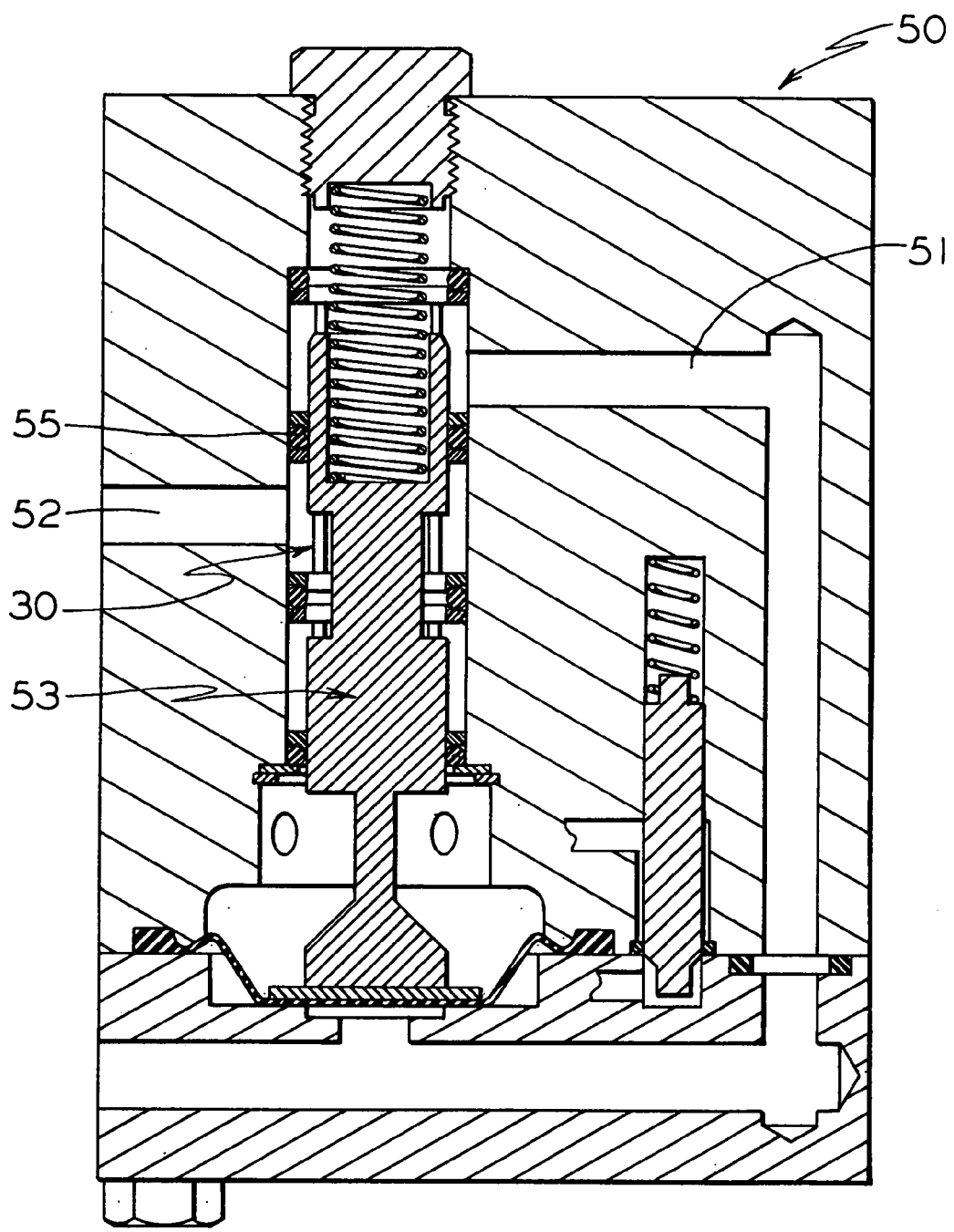
FIG. 6 is a second sectional view of the release valve shown in FIG. 5.

Now refer more particularly to FIGS. 1, 2, and 3 of the drawings. Illustrated therein is a device for securing a sealing member in a predetermined position, generally designated 1. The device comprises a positioning element 10 of a predetermined size and shape. The positioning element 10 has a first surface 11 and a second surface 12. A retaining element 20 is disposed on at least one of the first surface 11 and the second surface 12 of the positioning element 10. The positioning element 10 is an annulus having an inside diameter 13 and an outside diameter 14. The retaining element is an annulus having an inside diameter 21 and an outside diameter 22. Preferably, the positioning element 10 and the retaining element 20 are integrally formed, and the retaining element 20 is disposed on the first surface 11 of the positioning element 10. The inside diameter 21 of the retaining element 20 is substantially equal to the inside diameter 13 of the positioning element 10. The outside diameter 22 of the retaining element 20 is smaller than the outside diameter 14 of the positioning element 10. Preferably, the outside diameter 22 of the retaining element 20 has a bevel 23 with a first end 24 and a second end 25. A radius 26 of a predetermined size is disposed tangent to the first surface 11 of the positioning element 10 and the first end 24 of the bevel 23 of the retaining element 20.

Figure 4:
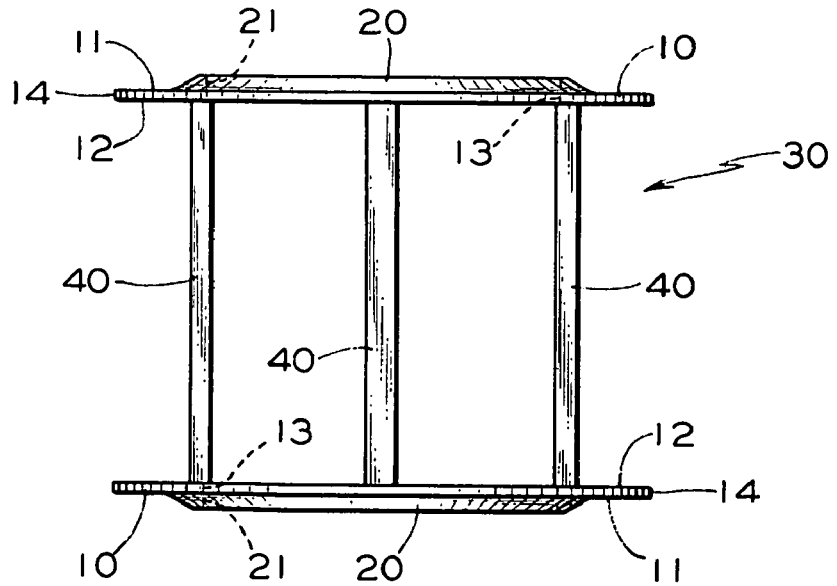
FIG. 4 is a vertical view of the device for securing a plurality of sealing members in a predetermined position.

Now refer more particularly to FIGS. 1, 3 and 4 of the drawings. Illustrated therein is a device for securing a plurality of sealing members in a predetermined position, generally designated 30. The device comprises two positioning elements 10 of a predetermined size and shape having a first surface 11 and a second surface 12. Two retaining elements 20 of a predetermined size and shape are disposed on the first surface 11 of the positioning elements 10. A spacer means 40 of a predetermined size and shape locates the positioning elements 10 a predetermined distance from each other. Preferably, the spacer means 40 is a plurality of four posts of a predetermined length disposed intermediate the positioning elements 10. The positioning elements 10 are annular shaped having an inside diameter 13 and an outside diameter 14. The retaining elements are annular shaped having an inside diameter 21 and an outside diameter 22. Preferably, the positioning elements 10 and the retaining elements 20 are integrally formed with the spacer means 40. The inside diameter 21 of the retaining elements 20 is substantially equal to the inside diameter 13 of the positioning elements 10. The outside diameter 22 of the retaining elements 20 is smaller than the outside diameter 14 of the positioning elements 10. Preferably, the outside diameter 22 of the retaining elements 20 has a bevel 23 with a first end 24 and a second end 25. A radius 26 of a predetermined size is disposed tangent to the first surface 11 of the positioning elements 10 and the first end 24 of the bevel 23 of the retaining elements 20.

Figure 5:
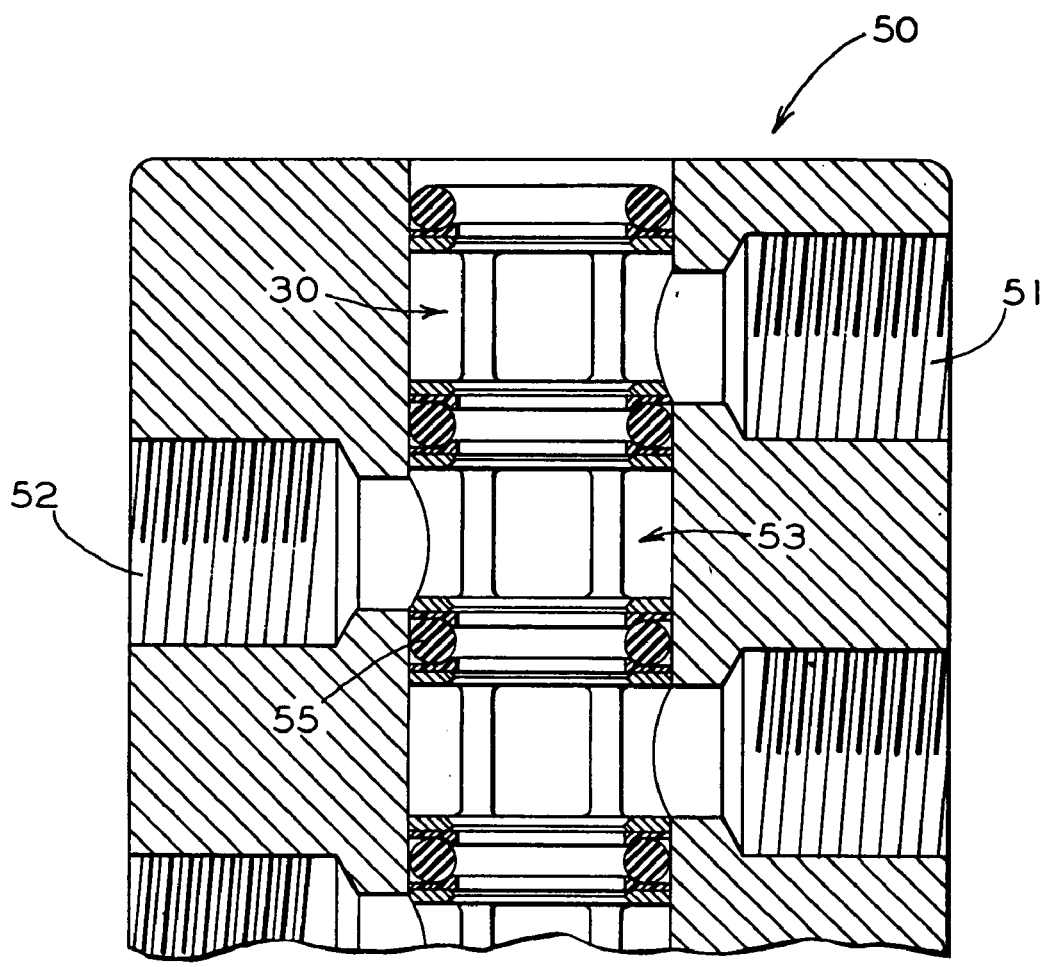
FIG. 5 is a vertical sectional view of a typical pressure release valve incorporating the improvement for securing a plurality of sealing members in a predetermined position.

Now refer more particularly to FIGS. 3, 4, and 5 of the drawings. Illustrated therein is an improvement in combination with a pressure release valve generally designated 50, having a high pressure port 51, a low pressure port 52, and a spool valve, generally designated 53. The spool valve further has a plurality of spool valve shells, generally designated 30. The improvement comprises the spool valve shells 30 having two positioning elements 10 of a predetermined size and shape, two retaining elements 20 of a predetermined size and shape disposed on the positioning elements 10, a spacer means 40 of a predetermined size and shape for locating the positioning elements 10 a predetermined distance from each other, and a sealing member 55 of a predetermined size and shape disposed intermediate two opposing positioning elements 10 of two adjacent spool valve shells 30. The retaining elements 20 on the opposing positioning elements 10 secure the sealing member 55 in position when the pressure release valve 50 is actuated. The positioning elements 10 have an inside diameter 13 and an outside diameter 14. The retaining elements have an inside diameter 21 and an outside diameter 22. Preferably, the positioning elements 10 and the retaining elements 20 are integrally formed with the spacer means 40. The inside diameter 21 of the retaining elements 20 is substantially equal to the inside diameter 13 of the positioning elements 10. The outside diameter 22 of the retaining elements 20 is smaller than the outside diameter 14 of the positioning elements 10. Preferably, the outside diameter 22 of the retaining elements 20 has a bevel 23 with a first end 24 and a second end 25. A radius 26 of a predetermined size is disposed tangent to the first surface 11 of the positioning elements 10 and the first end 24 of the bevel 23 of the retaining elements 20. Preferably, the spacer means 40 is a plurality of four posts disposed intermediate the positioning elements 10. The preferred shape of the sealing member 55 is an o-ring. The preferred material of the sealing member 55 is nitrile.

Although the invention has been shown in connection with a certain specific embodiment, it will be readily apparent to those skilled in the art that various changes in form and arrangement of parts may be made to suit requirements without departing from the spirit and scope of the invention.

I claim:

1. A device for securing a sealing member in a predetermined position, said device comprising:
    (a) a positioning element of a predetermined size and shape having a first surface and a second surface;
    (b) a retaining element formed as an annulus of a predetermined size and shape disposed on at least one of said first surface and said second surface of said positioning element; said annulus having an inner diameter identical to an inner diameter of said positioning element,
    (c) a bevel having a first end and a second end formed on an outer edge of said annulus such that said at least one of first surface and said second surface and said bevel forming a ledge extending from a lower portion of said bevel to an outer edge of said at least one of said first surface and said second surface of said positioning element; and
    (d) a radius disposed tangent to said at least one of said first surface and said second surface of said positioning element and transitioning smoothly into said first end of said bevel formed on said outer edge of said retaining member.

2. The device according to claim 1 wherein said positioning element and said retaining element are an annulus having an inside diameter and an outside diameter.

3. The device according to claim 2 wherein said inside diameter of said retaining element is substantially equal to said inside diameter of said positioning element.

4. The device according to claim 2 wherein said outside diameter of said retaining element is smaller than said outside diameter of said positioning element.

5. The device according to claim 1 wherein said positioning element and said retaining element are integrally formed.

6. The device according to claim 1 wherein said retaining element is disposed on said first surface of said positioning element.

7. A device for securing a plurality of sealing members in a predetermined position, said device comprising:
    (a) two positioning elements of a predetermined size and shape, each of said two positioning elements having a first outer surface and a second radially opposed inner surface;
    (b) two retaining elements formed as two annuluses of a predetermined size and shape disposed on said first outer surface of said positioning elements; each of said annuluses having an inner diameter identical to an inner diameter of said positioning elements,
    (c) a bevel having a first end and a second end formed on an outer edge of each of said annuluses such that said first surface and said bevel form a ledge, a radius disposed tangent to said at least one of said first surface and said second surface of said positioning element and transitioning smoothly into said first end of said bevel formed on said outer edge of said retaining member; and (d) a spacer means of a predetermined size and shape engageable with each of said radially opposed inner surface of said two positioning elements for locating said two positioning elements a predetermined distance from each other, said two positioning elements and said two retaining elements and said spacer means being formed integrally as a single piece.

8. The device according to claim 7 wherein said spacer means is a plurality of posts of a predetermined length disposed intermediate said positioning elements.

9. The device according to claim 8 wherein said plurality is four.

10. In combination with a pressure release valve having a high pressure port, a low pressure port, a spool valve, check valve, and a reset spool, said spool valve, check valve, and reset spool further having a plurality of spool valve shells, the improvement comprising:

(a) such spool valve shell having two positioning elements of a predetermined size and shape;

(b) two retaining elements formed as annuluses of a predetermined size and shape disposed on said first surface of each of said two retaining elements of said positioning elements, each of said annuluses having an inner diameter identical to an inner diameter of said positioning element; at least one of said first surface and said second surface of said positioning element;

(c) a bevel having a first end and a second end formed on an outer edge of each of said annuluses such that said at least one of first surface and said second surface and said bevel forming a ledge extending from a lower portion of said bevel to an outer edge of said at least one of said first surface and said second surface of said positioning element;

(d) a radius disposed tangent to said at least one of said first surface and said second surface of said positioning element and transitioning smoothly into said first end of said bevel formed on said outer edge of said retaining member;

(e) a spacer means of a predetermined size and shape for locating said positioning elements a predetermined distance from each other; and (f) a sealing member of a predetermined size and shape disposed intermediate two opposing said positioning elements of two such adjacent spool valve shells, whereby said retaining elements on opposing said positioning elements secure said sealing member in position when such pressure release valve is actuated.

11. The combination according to claim 10 wherein said positioning elements and said retaining elements have an inside diameter and an outside diameter.

12. The combination according to claim 11 wherein said inside diameter of said retaining elements is substantially equal to said inside diameter of said positioning elements.

13. The combination according to claim 11 wherein said outside diameter of said retaining elements is smaller than said outside diameter of said positioning elements.

14. The combination according to claim 10 wherein said sealing member is an o-ring.

15. The combination according to claim 14 wherein said o-ring material is nitrile.

* * * * *